Dec. 9, 1952 R. B. CAMPBELL 2,621,050
SELECTOR VALVE
Filed Feb. 2, 1946 2 SHEETS—SHEET 1
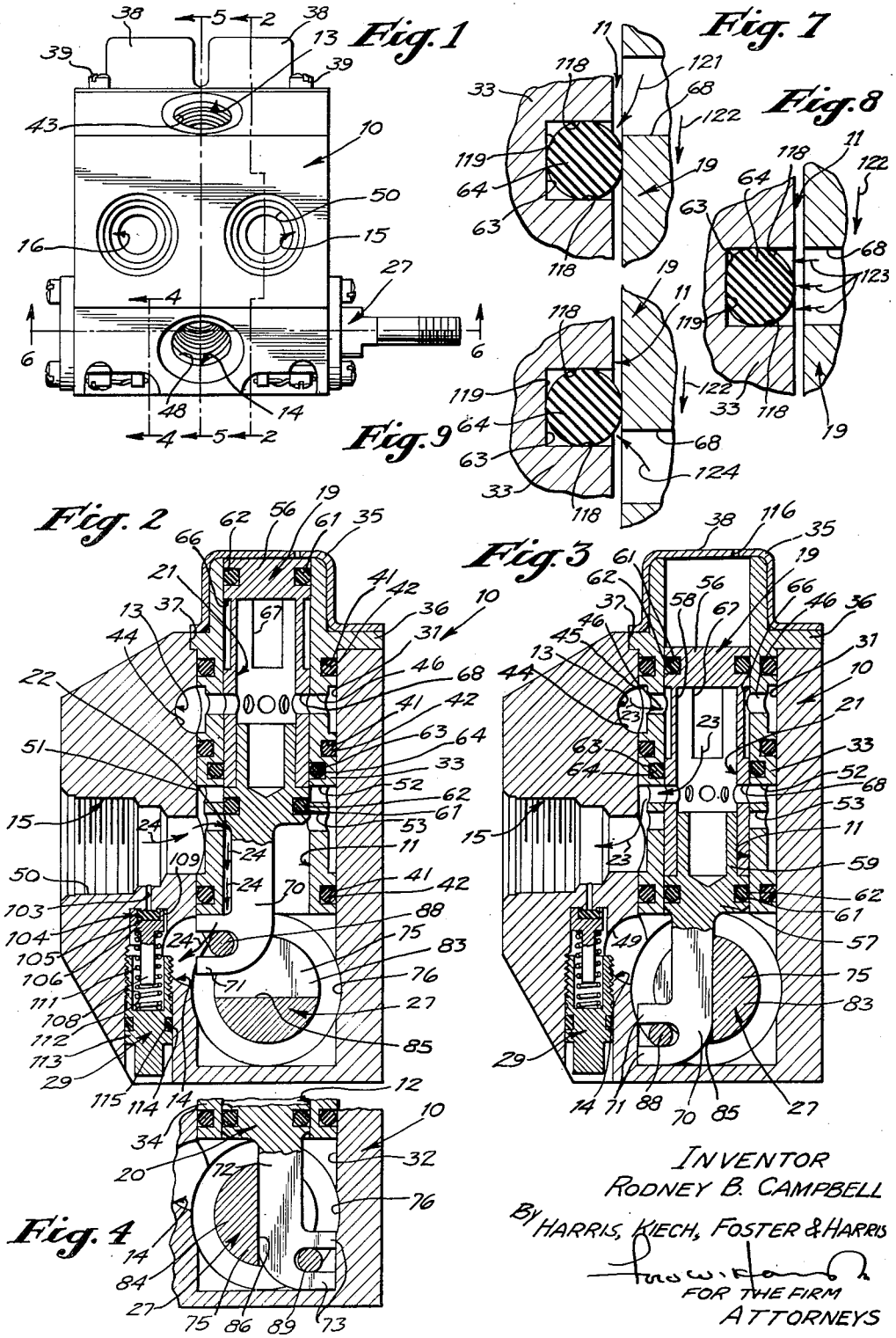
INVENTOR
RODNEY B. CAMPBELL
BY HARRIS, KIECH, FOSTER & HARRIS
FOR THE FIRM
ATTORNEYS Dec. 9, 1952 — R. B. CAMPBELL — 2,621,050
SELECTOR VALVE
Filed Feb. 2, 1946 — 2 SHEETS—SHEET 2

INVENTOR
RODNEY B. CAMPBELL
BY HARRIS, KIECH, FOSTER & HARRIS
FOR THE FIRM
ATTORNEYS

Patented Dec. 9, 1952

2,621,050

UNITED STATES PATENT OFFICE 2,621,050

SELECTOR VALVE

Rodney B. Campbell, Van Nuys, Calif., assignor to Malcolm R. Maben, trustee, Van Nuys, Calif.

Application February 2, 1946, Serial No. 645,199

2 Claims. (Cl. 277—12)

My invention relates generally to valves and, more specifically, to selector valves which may be employed for controlling the distribution of fluids, a primary object of my invention being the provision of a selector valve which is adapted for reversing the direction of flow of a fluid. A selector valve of this general character may be incorporated in any installation wherein flow reversals are required, and is particularly adapted for employment in hydraulic systems to control the direction of motion of various hydraulically-actuated, reversible members such as pistons, for example.

In general, my selector valve includes a valve body having an inlet passage therein which may be connected to a fluid supply source, and having an outlet passage therein for expended fluid, the valve body also being provided with a pair of auxiliary passages which may be connected to any desired installation to supply fluid thereto and to return expended fluid therefrom. Another object of my invention is the provision of a selector valve including means for reversing the direction of flow through the aforesaid auxiliary passages whereby either auxiliary passage may be employed for supplying fluid to the desired installation, or for returning expended fluid therefrom.

The valve body is preferably provided with a pair of valve chambers having means therein for controlling the direction of flow through the auxiliary passages, the inlet and outlet passages communicating with both valve chambers and each auxiliary passage communicating with only one of the valve chambers. The selector valve is provided with a valve member in each valve chamber, a further object of my invention being the provision of valve members each of which is adapted to provide fluid communication between the inlet passage and either auxiliary passage, and between either auxiliary passage and the outlet passage.

An important object of my invention is the provision of actuating means for moving the valve members in the valve chambers into either a neutral position, or into one of a pair of operating positions in which flow through the auxiliary passages is in opposite directions. More specifically, an object of my invention is to provide operating positions in each of which one of the valve members provides communication between the inlet passage and one of the auxiliary passages, and in each of which the other valve member provides communication between the other auxiliary passage and the outlet passage.

Still another object is to provide means for releasably securing the actuating means in the neutral position to indicate the neutral position of the valve members to an operator of the selector valve.

An additional object of my invention is the provision of actuating means including eccentric means for moving the valve members and for maintaining the desired relationship therebetween.

An important object is the provision of a valve wherein rubber-like sealing elements may be employed to provide a seal between the valve member and the walls of the valve chamber and may be slidably moved past ports in the walls of the valve chamber without damage.

Still another object is the provision of a valve wherein the valve members are hydraulically balanced by fluid in the valve chambers.

The foregoing objects and advantages of my invention, together with various other objects and advantages which will be apparent hereinafter, may be realized by means of the embodiment which is illustrated in the accompanying drawings and is described in detail hereinafter. Referring to the drawings, which are intended as illustrative only;

Fig. 1 is an elevational view of a selector valve which embodies the fundamental principles of my invention;

Fig. 2 is an enlarged sectional view thereof which is taken along the broken line 2—2 of Fig. 1 and which illustrates one operating position of one valve member;

Fig. 3 is a view which is similar to Fig. 2, but which illustrates another operating position of the valve member shown therein;

Fig. 4 is an enlarged, fragmentary sectional view which is taken along the broken line 4—4 of Fig. 1 and which illustrates the operating position of another valve member which corresponds to the operating position of the valve member shown in Fig. 2;

Figure 5:
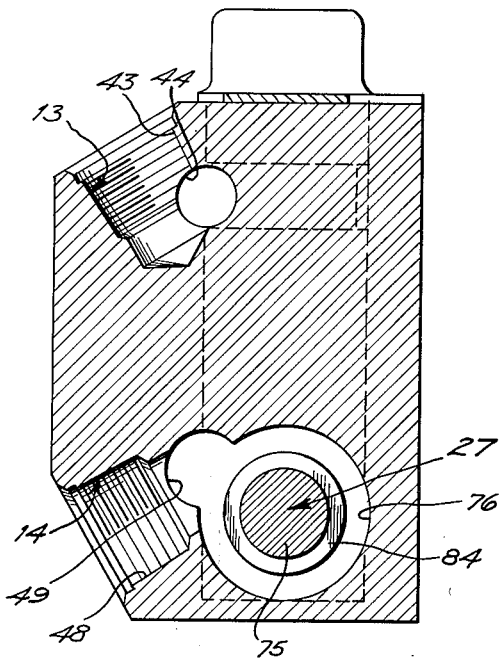
Figure 6:
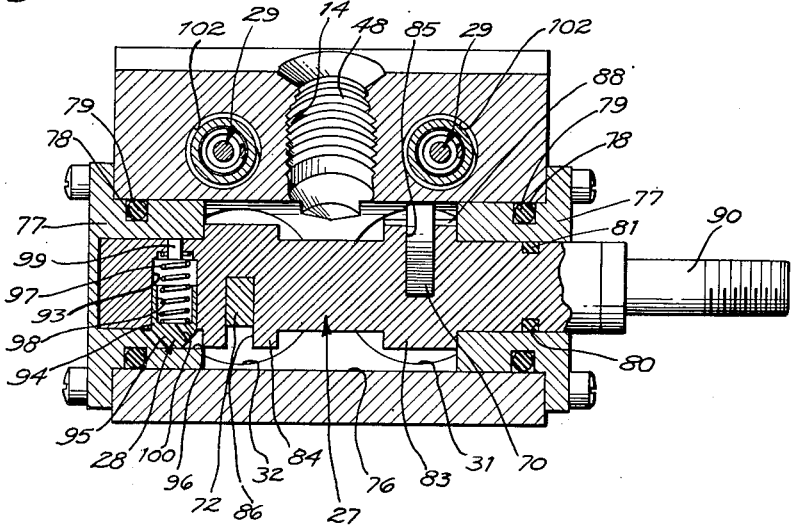

Figs. 5 and 6 are enlarged sectional views which are taken along the broken lines 5—5 and 6—6, respectively, of Fig. 1; and Figs. 7, 8, and 9 are further enlarged, fragmentary sectional views which illustrate the operation of a sealing element.

Referring to the drawings, the selector valve includes a valve body 10 having a pair of valve chambers 11 and 12 therein which are preferably cylindrical and are best shown in Figs. 2 and 4, respectively, the valve body being provided with an inlet passage 13 therein which communicates with both valve chambers, and being provided with an outlet passage 14 therein which also communicates with both valve chambers. The valve body 10 is also provided with a pair of auxiliary passages 15 and 16 therein which communicate with the valve chambers 11 and 12, respectively.

Valve members 19 and 20 are slidably disposed in the valve chambers 11 and 12, respectively, as best shown in Figs. 2 and 4, respectively. The valve member 19 is provided with passages 21 and 22, the passage 21 being adapted to provide communication between the inlet passage 13 and the auxiliary passage 15 to permit flow out of the auxiliary passage 15 as indicated by the arrows 23 in Fig. 3, and the passage 22 being adapted to provide communication between the auxiliary passage 15 and the outlet passage 14 to permit flow into the auxiliary passage 15 and out of the outlet passage as indicated by the arrows 24 in Fig. 2. Similarly, the valve member 20 is provided with passages which are adapted to permit flow either into the inlet passage 13 and out of the auxiliary passage 16, or into the auxiliary passage 16 and out of the outlet passage 14. Since the valve member 20 and the aforesaid passages thereof are identical to the valve member 19 and the passages 21 and 22 thereof, the details of the valve member 20 are not shown in the drawings.

The selector valve includes actuating means 27 for moving the valve members 19 and 20 into either a neutral position or into one of a pair of operating positions. In one operating position, the valve member 19 provides communication between the inlet passage 13 and the auxiliary passage 15 as indicated by the arrows 23 in Fig. 3, and the valve member 20 provides communication between the auxiliary passage 16 and the outlet passage 14 in a manner which is not specifically shown but which is substantially the same as the manner in which the valve member 19 provides communication between the auxiliary passage 15 and the outlet passage as indicated by the arrows 24 in Fig. 2, the valve member 20 being in a position which is shown partially in Fig. 4. In the other operating position, the valve member 19 provides communication between the auxiliary passage 15 and the outlet passage 14 as indicated by the arrows 24 in Fig. 2, and the valve member 20 provides communication between the inlet passage 13 and the auxiliary passage 16 in a manner which is not specifically shown in the drawing but which is substantially identical to the manner in which the valve member 19 provides communication between the inlet passage and the auxiliary passage 15 as indicated by the arrows 23 in Fig. 3. Thus, it will be apparent that in the operating position shown in Fig. 2, fluid flows from the inlet passage 13 to the auxiliary passage 16, and from the auxiliary 15 to the outlet passage 14, whereas in the operating position shown in Fig. 3, fluid flows from the inlet passage to the auxiliary passage 15, and from the auxiliary passage 16 to the outlet passage. Thus, in the operating position shown in Fig. 2, the auxiliary passage 16 may serve as a supply passage for a desired installation and the auxiliary passage 15 may serve as a return passage for expended fluid, whereas in the operating position shown in Fig. 3, the auxiliary passage 15 serves as the supply passage and the auxiliary passage 16 serves as the return passage.

When the valve members 19 and 20 are in the neutral position, communication between the inlet passage 13 and the auxiliary passages 15 and 16 and between the auxiliary passages and the outlet passage 14 is prevented so that no flow occurs. In order to provide an operator of the selector valve with positive means for determining the neutral position, I prefer to provide means 28 for releasably securing the actuating means 27 in the neutral position to provide the operator of the selector valve with the desired "feel" for the neutral position.

For certain applications of my invention which will be described in detail hereinafter, I prefer to provide the selector valve with pressure regulating means 29, as best shown in Figs. 2 and 3, to prevent the development of excessive fluid pressures in the auxiliary passages 15 and 16 because of thermal expansion of the fluid therein when the valve members 19 and 20 are in the neutral position.

Considering the selector valve in more detail, the valve body 10 is provided with a pair of longitudinal bores 31 and 32 therein as shown in Figs. 2 and 4, respectively, or as best shown in Fig. 6. The bores 31 and 32 are provided with identical tubular liners 33 and 34 therein, respectively, which define the cylindrical valve chambers 11 and 12, respectively, only the liner 33 being shown completely since the two are identical. Consequently, the two liners 33 and 34 and the structure associated therewith will be described simultaneously.

The liners 33 and 34 include annular flanges 36 which are seated in recesses 37 in the valve body 10, the valve chambers 11 and 12 being enclosed by flanged caps 38 which receive an end of each of the liners. The liners 33 and 34 and the flanged caps 38 may be secured to the valve body 10 by screws 39 or the like, as shown in Fig. 1, which extend through the flanges 36 on the liners. The liners 33 and 34 are provided with a plurality of annular grooves 41 therein having annular sealing elements 42 therein to provide a fluid-tight seal between the liners and the valve body 10, the sealing elements preferably being formed of a material such as rubber or the like.

The inlet passage 13 includes a threaded bore 43 for a suitable inlet fitting (not shown), and includes a transverse bore 44 which communicates with an annular groove 45 in each of the liners 33 and 34. The liners 33 and 34 are provided with a plurality of ports 46 therein which provide communication between the annular grooves 45 and the valve chambers 11 and 12.

The outlet passage 14 is similar to the inlet passage 13 and includes a threaded bore 48 for a suitable outlet fitting (not shown) as best shown in Fig. 5. The outlet passage 14 includes a transverse bore 49 which provides communication between the longitudinal bores 31 and 32 and hence between the valve chambers 11 and 12 as best shown in Figs. 2 and 4.

The auxiliary passage 15 includes a threaded bore 50 in the valve body 10 which communicates with an annular groove 51 in the liner 33, the auxiliary passage 15 also including ports 52 and 53 which extend through the liner 33 into the valve chamber 11. The auxiliary passage 16 is identical to the auxiliary passage 15, except that it communicates with the valve chamber 12 instead of the valve chamber 11, and is not shown completely.

With one exception which will be described in detail hereinafter, the structures of the valve members 19 and 20 are identical, the valve member 20 not being shown completely, and will, therefore, be described simultaneously. The valve members 19 and 20 are piston-shaped and are preferably formed in two sections 56 and 57 which are suitably secured together for convenience of manufacture, each section 56 being provided with a bore 58 therein which receives a complementary portion 59 of the corresponding section 57. Each of the valve members 19 and 20 is provided with annular grooves 61 therein for annular sealing elements 62 of a material such as rubber or the like to provide a fluid-tight seal between the valve members 19 and 20 and the liners 33 and 34, respectively. Each of the liners 33 and 34 is also provided with an annular groove 63 therein for a rubber-like sealing element 64 to provide a fluid-tight seal between the ports 46 and 52 in the liners when the valve members 19 and 20 are in operating positions such as those illustrated by the valve member 19 in either Fig. 2 or Fig. 3, the annular sealing elements 64 being adapted to provide a seal between the ports 46 and 52 through the liners in a manner which will be described in detail hereinafter in connection with Figs. 7 to 9, inclusive.

The passage 21 through the valve member 19 includes an annular groove 66 therein which is adapted to communicate with the ports 46 through the liner 33 when the valve member 19 is in the operating position shown in Fig. 3, the passage 21 including openings 67 which communicate with the annular groove 66 to admit fluid into the bore 58 in the valve member 19. The passage 21 also includes ports 68 which are adapted to register with the ports 52 in the liner 33 to permit fluid to flow into the auxiliary passage 15 when the valve member 19 is in the position shown in Fig. 3. The valve member 20 is provided with a passage therethrough which is identical to the passage 21 but which is adapted to provide communication between the inlet passage 13 and the auxiliary passage 16 instead of the auxiliary passage 15.

The passage 22 of the valve member 19 provides fluid communication between the auxiliary port 15 and the outlet port 14 when the valve member 19 is in the position shown in Fig. 2, the passage 22 being defined by one end of the valve member 19 and portions of the wall of the valve chamber 11 thereadjacent. The valve member 20 is provided with a passage which is identical to the passage 22 except that it is adapted to provide communication between the auxiliary port 16 and the outlet port 15 when the valve member 20 is in an operating position corresponding to the operating position of the valve member 19 which is shown in Fig. 2.

The valve member 19 includes a bifurcated actuating element 70 having branches or arms 71, as shown in Fig. 2, and the valve member 20 includes an actuating element 72 having branches or arms 73, as shown in Fig. 4, the only structural difference between the valve members 19 and 20 being that the arms 71 and 73 of the actuating elements 70 and 72 extend in opposite directions. In all other respects, the structures of the valve members 19 and 20 are identical as mentioned previously.

As best shown in Figs. 5 and 6, the actuating means 27 includes a rotatable actuating member or shaft 75 which is disposed in a transverse bore 76 in the valve body 10, the transverse bore 76 being perpendicular to the valve chambers 11 and 12. The shaft 75 is journaled in bearings 77 which may be bolted or otherwise secured to the valve body 10, each of the bearings being provided with an annular groove 78 therein for an annular sealing element 79 of rubber or the like to provide a fluid-tight seal between the bearings and the valve body. The shaft 75 is provided with an annular groove 80 therein for an annular sealing element 81 to seal the shaft with respect to one of the bearings 77, the shaft being enclosed by the other bearing.

The shaft 75 is formed with two enlarged portions 83 and 84 having transverse slots 85 and 86 therein, respectively, which receive the actuating elements 70 and 72 therein, respectively. As best shown in Figs. 2, 3, and 5, an eccentric element 88 extends across the slot 85 and is disposed between the branches 71 of the actuating element 70, the eccentric element being suitably secured to the enlarged portion 83 of the shaft 75. Another eccentric element 89 is disposed diametrically opposite the eccentric element 88, the eccentric element 89 extending across the slot 86 and being disposed between the branches 73 of the actuating element 72 as best shown in Fig. 4. As the shaft 75 is rotated by any suitable mechanism (not shown) which may be connected to an end portion 90 thereof, the eccentric elements 88 and 89 act through the actuating elements 70 and 71, respectively, to reciprocate the valve members 19 and 20, respectively, in the valve chambers 11 and 12. Thus, the valve member 19 may be displaced from the operating position shown in Fig. 3 through the neutral position and into the operating position shown in Fig. 2 by rotating the shaft 75 in a clockwise direction as viewed in Figs. 2 and 3. Such rotation simultaneously displaces the valve member 20 from an operating position corresponding to that shown in Fig. 2 through the neutral position and into an operating position corresponding to that shown in Fig. 3 because of the relative positions of the actuating elements 70 and 72 and eccentric elements 88 and 89 as previously described.

Thus, when the shaft 75 is in a position such that the eccentric elements 88 and 89 assume the positions shown in Figs. 2 and 4, respectively, the valve member 19 provides fluid communication between the auxiliary passage 15 and the outlet passage 14 through the passage 22, as indicated by the arrows 24, and the valve member 20 provides fluid communication between the inlet passage 13 and auxiliary passage 16 through the aforesaid passage thereof which corresponds to the passage 21 of the valve member 19. Similarly, when the shaft 75 is in a position such that the eccentric element 88 assumes the position shown in Fig. 3 and the eccentric element 89 assumes a corresponding position (not shown) the valve member 19 provides fluid communication between the inlet passage 13 and auxiliary passage 15 through the passage 21, as indicated by the arrows 23, and the valve member 20 provides fluid communication between the auxiliary passage 16 and the outlet passage 14 through the aforesaid passage thereof which corresponds to the passage 22 of the valve member 19. The two operating positions are positively defined in view of the fact that the travel of the actuating elements 70 and 72 is limited by the end walls of the bores 31 and 32 respectively, and by adjacent ends of the liners 33 and 34, respectively, as will be apparent from Figs. 2, 3, and 4.

In order to define the neutral position of the valve members 19 and 20, the neutral position being substantially midway between the two operating positions, and to provide the operator of the selector valve with a positive feel for the neutral position. I prefer to provide the means 28 for releasably securing the actuating means 27 in the neutral position. As best shown in Fig. 6, the shaft 75 is provided with a transverse bore 93 therein for a detent 94 having a tapered nose 95 which extends into a notch 96 in one of the bearings 77 when the shaft, and consequently the valve members 19 and 20, are in the neutral position, the detent being urged into the notch by a compression spring 97 which is seated in a bore 98 in the detent and is retained by a pin 99. The detent 94 is provided with a bleed opening 100 therethrough to provide equal fluid pressures on either end thereof so that the detent will operate in the same manner regardless of the pressure of the fluid thereadjacent.

Although my selector valve may be employed for performing various functions, the valve may be used particularly advantageously for actuating a double-acting piston (not shown) which may be employed for extending and retracting the landing gear (not shown) of an airplane, for example. By connecting the auxiliary passages 15 and 16 to opposite sides of such a piston, the flow of fluid to and from the piston may be reversed as desired to produce movement of the piston in either direction, since, in one operating position, fluid flows from the auxiliary port 15 and into the auxiliary port 16, and, in the other operating position, the flow is in the opposite direction. However, the selector valve may be employed for performing various other functions and I do not intend to be limited to the particular function described.

In many applications of the selector valve, it may be necessary to compensate for possible pressure increases due to thermal expansion of the fluid in the auxiliary ports 15 or 16 when the valve is in the neutral position for any length of time, this being particularly true of the double-acting piston installation described in the preceding paragraph wherein the valve may be operated at only infrequent intervals. The pressure regulating means 29 are adapted to release fluid from the auxiliary passages 15 and 16 to compensate for such pressure increases and are disposed in bores 102 in the valve body 10, as best shown in Fig. 5, each bore communicating with the outlet passage 14 and with one of the auxiliary passages 15 and 16 through a bleed opening 103, as best shown in Fig. 2 wherein one of the pressure regulating means is shown in detail, the other being identical thereto. A valve element 104 is adapted to seal the bleed opening 103, the valve element being disposed in a bore 105 in the head 106 of a plunger which is provided with a stem 108. The plunger head 106 is provided with a slot 109 therein which communicates with the outlet passage 14 and which communicates with the bleed opening 103 when the valve element 104 is unseated. The valve element is normally held closed by a compression spring 111 which encircles the plunger stem 108 and which is disposed in a bore 112 in a plug member 113, the plug member being threadedly disposed in the bore 102 and being provided with an annular groove 114 therein for a sealing element 115. The position of the plug member 113 in the bore 102 may be varied to vary the force exerted by the spring 111 on the valve element 104. It will be apparent that whenever the pressure in the auxiliary passage 15 (or in the auxiliary passage 16) exceeds a value which is determined by the force exerted by the spring 111, the valve element 104 will be unseated to release sufficient fluid to reduce the pressure to the desired value.

It will be apparent that the valve members 19 and 20 are hydraulically balanced internally since all openings therein are so formed that fluid therein exerts equal forces in both directions, each increment of area being complemented by an area increment of the same size. The valve members 19 and 20 are also hydraulically balanced externally if the fluid pressure in the valve chambers 11 and 12 adjacent the outlet passage 14 is equal to atmospheric pressure, each of the caps 38 being provided with an opening 116 therethrough to vent the opposite ends of the valve chambers to atmospheric pressure. The openings 116 also serve as bleeds to release any fluid which may leak past the sealing elements 63. If the pressure in the valve chambers 11 and 12 adjacent the outlet port 15 is other than atmospheric, it will be apparent that the valve members 19 and 20 may be balanced externally by providing for fluid communication between the opposite ends of the valve chambers.

Referring particularly to Figs. 2 and 3, it should be noted that the annular sealing element 64 provides a fluid-tight seal between the ports 46 and 52 through the liner 33 when the valve member 19 is in either of the operating positions illustrated. It will be apparent that when the valve member 19 is displaced from the operating position illustrated in Fig. 2 to the position illustrated in Fig. 3, the ports 68 must move past the sealing element 64. Since the sealing element 64 is preferably formed of a flexible and resilient material such as rubber or the like, the construction of the sealing element 64 and the annular groove 63 therefor must be designed so that the ports 68 slide past the sealing element in such a manner that the edges of the ports do not damage the sealing element.

The construction and operation of the sealing element 64 are best shown in detail in the enlarged sectional views of Figs. 7 to 9, inclusive.

Referring particularly to Fig. 7, it will be noted that the sealing element 64, which is preferably of circular cross section, normally engages the side walls 118 of the annular groove 63 in the liner 33 and may engage the base wall 119 thereof, the relative dimensions of the sealing element and groove being such that portions of the sealing element are normally spaced from adjacent portions of the base and side walls of the groove. The sealing element 64 also engages the surface of the valve member 19 to provide a fluid-tight seal between the valve member 19 and liner 33, the pressure exerted by the fluid in the port 68 acting in the direction indicated by the arrow 121.

As the valve member 19 is displaced in the direction of the arrow 122 so that the port 68 is opposite the sealing element 64 as shown in Fig. 8, the pressure exerted by the fluid acts in the direction indicated by the arrows 123 to deform the sealing element and compress it into the groove 63, the sealing element being deformed and compressed into the spaces existing between the normally undeformed sealing element and the base and side walls of the groove. Thus, the sealing element 64 disengages portions of the surface of the valve member 19 adjacent the port 68 so that the port may move past the sealing element without having the sealing element contact the edges of the port, thereby preventing "chewing" or "tearing" of the sealing element by the port edges. As the valve member 19 is displaced into the position shown in Fig. 9, the port 68 moves completely past the sealing element 64 and the latter assumes its original, undeformed configuration so that the sealing element reengages the surface of the valve member 19 to provide a fluid-tight seal between the ports 46 and 52, the pressure exerted by the fluid in the port 68 now acting in the direction of the arrow 124. The sealing element 64 is compressed and clears the port 68 in a similar manner when the valve member 19 is displaced in the direction opposite to that indicated by the arrow 122. The sealing element 62 also operates in a similar manner with respect to the port 53. This feature of my invention thus permits the use of sealing elements of rubber or similar materials to provide a fluid-tight seal adjacent ports in a member while preventing damage to the sealing elements by the port edges whenever the sealing elements are displaced across the ports.

Although I have described an exemplary embodiment of my invention and have suggested a particular application thereof, I do not intend to be limited to the specific disclosures contained herein since the invention is susceptible to various other applications, and since various changes, modifications, and substitutions may be incorporated in the embodiment disclosed without departing from the spirit of the invention. I hereby reserve the right, therefore, to all such changes, modifications, and substitutions, and to all such applications of my invention as properly come within the scope of my appended claims.

I claim as my invention:

1. In a selector valve, the combination of: a pair of valve chambers respectively providing axes which are disposed in a common plane; inlet passage means communicating with said valve chambers; outlet passage means communicating with said valve chambers; a pair of auxiliary passage means respectively communicating with said valve chambers; valve means for providing fluid communication between said inlet passage means and one of said auxiliary passage means and between the other of said auxiliary passage means and said outlet passage means, said valve means including a pair of valve members which are reciprocable in the respective valve chambers; and actuating means rotatable about an axis parallel to said plane for moving said valve members in opposite directions in the respective valve chambers.

2. In a valve, the combination of: a valve chamber provided with first, second and third ports; and a piston-like valve member movable in said valve chamber between first and second positions, said valve member being provided with a passage therethrough which connects said first and second ports when said member is in said first position, and an end of said valve member being adapted to uncover said second and third ports when said member is in said second position to provide fluid communication between said second and third ports.

RODNEY B. CAMPBELL.

REFERENCES CITED

The following references are of record in the file of this patent:

UNITED STATES PATENTS

| Number | Name | Date |
| --- | --- | --- |
| 331,789 | Harvey | Dec. 8, 1885 |
| 2,010,329 | Speth | Aug. 6, 1935 |
| 2,101,025 | Hunt | Dec. 7, 1937 |
| 2,360,839 | Bartsdale | Oct. 24, 1944 |
| 2,365,748 | Curtis | Dec. 26, 1944 |
| 2,414,451 | Christensen | Jan. 21, 1947 |

FOREIGN PATENTS

| Number | Country | Date |
| --- | --- | --- |
| 12,913 | Great Britain | of 1905 |